(12) United States Patent
Martin et al.

(10) Patent No.: US 7,223,814 B2
(45) Date of Patent: May 29, 2007

(54) HOT MELT ADHESIVES WITH IMPROVED PERFORMANCE WINDOW

(75) Inventors: Laura Lee Martin, Blountville, TN (US); Stephen Dale Orth, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 154 days.

(21) Appl. No.: 10/715,157

(22) Filed: Nov. 17, 2003

(65) Prior Publication Data

US 2005/0106385 A1 May 19, 2005

(51) Int. Cl.
*C08L 51/06* (2006.01)

(52) U.S. Cl. .......................... 524/504; 525/70; 525/74

(58) Field of Classification Search ................. 525/70, 525/74; 524/504
See application file for complete search history.

(56) References Cited

U.S. PATENT DOCUMENTS

| | | | |
|---|---|---|---|
| 2,969,345 A | 1/1961 | Coover, Jr. et al. | |
| 3,277,039 A | 10/1966 | Marascia et al. | |
| 3,480,580 A | 11/1969 | Joyner et al. | |
| 3,481,910 A | 12/1969 | Brunson | |
| 3,645,992 A | 2/1972 | Elston | |
| 3,856,889 A | 12/1974 | McConnell | |
| 4,299,745 A | 11/1981 | Godfrey | |
| 4,358,564 A | 11/1982 | Ames | |
| 5,272,236 A | 12/1993 | Lai et al. | |
| 5,278,272 A | 1/1994 | Lai et al. | |
| 5,458,982 A | 10/1995 | Godfrey | |
| 5,744,250 A * | 4/1998 | Lee et al. ................... | 428/516 |
| 5,763,516 A * | 6/1998 | Godfrey ..................... | 524/271 |
| 6,107,430 A | 8/2000 | Dubois et al. | |
| 6,221,448 B1 | 4/2001 | Baetzold et al. | |
| 6,319,979 B1 | 11/2001 | Dubois et al. | |
| 6,399,191 B1 * | 6/2002 | Wong ......................... | 428/344 |
| 6,656,601 B1 * | 12/2003 | Kawachi et al. ............ | 428/483 |
| 2005/0288443 A1* | 12/2005 | Mavridis et al. ........... | 525/240 |
| 2006/0052022 A1* | 3/2006 | Suzuki et al. ............... | 442/328 |

FOREIGN PATENT DOCUMENTS

| EP | 0 315 418 A2 | 5/1989 |
|---|---|---|
| EP | 0 879 862 A1 | 11/1998 |

OTHER PUBLICATIONS

Notification of Transmittal of the International Search Report and the Written Opinion of the International Searching Authority, or the Declaration dated Feb. 17, 2005.

* cited by examiner

*Primary Examiner*—Jeffrey Mullis
(74) *Attorney, Agent, or Firm*—Polly C. Owen; Bernard J. Graves, Jr.

(57) ABSTRACT

An adhesive composition is provided comprising at least one copolymer comprising repeating units from ethylene and at least one α-olefin, at least one tackifier resin, and at least one grafted polyolefin; wherein said adhesive composition has an onset of fiber tear of less than about 35° F. Articles and processes for producing the adhesive composition is also provided.

52 Claims, No Drawings

HOT MELT ADHESIVES WITH IMPROVED PERFORMANCE WINDOW

FIELD OF THE INVENTION

This invention is related to adhesive compositions. More specifically, this invention is related to adhesive compositions comprising at least one copolymer comprising repeating units from ethylene and at least one α-olefin, at least one tackifier resin, and at least one grafted polyolefin.

BACKGROUND OF THE INVENTION

Hot melt adhesives are widely used in industry for various packaging applications. Most such applications require that the adhesive have a fast set time, good machinability, and good bond aging properties. In addition, it is desirable that the adhesive maintain bonds over as broad a temperature range as possible.

Most hot-melt adhesives are based on polyethylene or ethylene-vinyl acetate copolymer. Polyethylene and chemically modified polyethylene based formulas tend to have excellent elevated temperature properties, while ethylene-vinyl acetate based adhesives tend to have very good low temperature properties. The choice of which of these two adhesives to use sometimes depends upon the needed properties of the final end use. Blending of polyethylene or chemically modified polyethylene with ethylene-vinyl acetate to obtain broader temperature properties is often not very effective because of compatibility problems. Therefore, a hot melt adhesive for packaging applications having good bond strength over a broad temperature has not been possible.

In light of the above, it would be desirable to be able to produce a hot melt adhesive having good bond strength at elevated temperatures and at low temperatures in order for the adhesive to be utilized in a broad array of applications.

BRIEF SUMMARY OF THE INVENTION

Surprisingly, it has been found that incorporation of at least one grafted polyolefin with at least one copolymer comprising repeating units from ethylene and an α-olefin and at least one tackifier resin yields an adhesive composition having superior adhesion at both low and high temperatures. Specifically, this is shown by excellent Shear Adhesion Failure Test (SAFT), Peel Adhesion Failure Test (PAFT), and Onset of Fiber Tear values of the inventive adhesive composition.

In accordance with an embodiment of this invention, an adhesive composition is provided comprising at least one copolymer comprising repeating units from ethylene and at least one α-olefin, at least one tackifier resin, and at least one grafted polyolefin; wherein the adhesive composition has an onset of fiber tear of less than about 35° F.

In accordance with another embodiment of this invention, an adhesive composition is provided comprising at least one copolymer comprising repeating units from ethylene and at least one α-olefin, at least one tackifier resin, and at least one grafted polyolefin; wherein the adhesive composition has a shear adhesion failure temperature greater than about 180° F.

In accordance with another embodiment of this invention, an adhesive composition is provided comprising at least one copolymer comprising repeating units from ethylene and at least one α-olefin, at least one tackifier resin, and at least one grafted polyolefin; wherein the adhesive composition has a peel adhesion failure temperature greater than about 110° F.

In accordance with this invention, an article comprising the adhesive composition and a substrate is provided. In particular, the article can be a package or cardboard box.

In accordance with this invention, a process for producing the adhesive composition is provided. The process comprises contacting at least one copolymer comprising repeating units from ethylene and at least one α-olefin, at least one tackifier resin; and at least one grafted polyolefin to produce the adhesive composition.

DETAILED DESCRIPTION

In this invention, an adhesive composition is provided comprising:

(a) at least one copolymer comprising repeating units from ethylene and at least one α-olefin;
(b) at least one tackifier resin; and
(c) at least one grafted polyolefin; and
wherein the adhesive composition has a onset of fiber tear less than about 35° F.

The copolymer comprising repeating units from ethylene and at least one α-olefin can be linear, substantially linear, or branched. Hereinafter, this copolymer will be referred to as the "ethylene copolymer". This term means any copolymer, terpolymer or interpolymer comprising repeating units from ethylene and at least one α-olefin. The term "linear ethylene copolymer" means that the ethylene copolymer does not have long chain branching. The term "substantially linear ethylene copolymer" means that the polymer backbone is substituted with about 0.01 long chain branches/1000 carbons atoms to about 3 long chain branches/1000 carbon atoms. Linear or substantially linear polyethylene has a polydispersity generally between about 1.5 and about 2.5, which indicates that it has a narrow molecular weight distribution. The term "branched ethylene copolymer" means that the polymer backbone is substituted with more than 3 long chain branches/1000 carbon atoms.

Generally, the α-olefin has from 3 to about 12 carbon atoms, preferably from 3 to 8 carbon atoms. Suitable examples of α-olefins include, but are not limited to, the $C_2$-$C_{10}$ α-olefins especially 1-propene, 1-butene, isobutylene, 1-hexene, 4-methyl-1-pentene, and 1-octene. Preferably, the α-olefin is butene and octene.

The ethylene copolymer has a low density ranging from about 0.85 g/ml to about 0.92 g/ml, preferably from about 0.87 g/ml to about 0.91 g/ml, most preferably from 0.89 g/ml to 0.91 g/ml. In order to synthesize low-density linear, substantially linear, or branched polyethylene, a comonomer must be used.

The ethylene copolymer can be produced by any method known in the art capable of producing ethylene copolymer having a density ranging from 0.85 g/ml to about 0.92 g/ml. Both linear and branched polyethylene can be produced by various methods including, but not limited to, gas phase, suspension, slurry loop, and solution polymerization processes.

To synthesize linear or substantially linear polyethylene, metallocene catalysts or single-site catalysts can be used. Metallocene catalysts are a subset of Ziegler Natta catalysts. Ziegler Natta catalysts include chelated metals (organometallic catalysts) that are both soluble and insoluble in the monomer to be polymerized. Metallocene catalysts are chelated metals that contain a ligand moiety. The ligand moiety promotes solubility of the catalyst in the ethylene monomer. In addition, the metallocene catalyst contains a single active site that results in a narrow molecular weight distribution. Any metallocene capable of producing the ethylene copolymer having a density ranging from about 0.85 g/ml to about 0.92 g/ml can be utilized.

U.S. Pat. Nos. 5,278,272 and 5,272,236, both of which are herein incorporated by reference, disclose methods of producing linear and substantially linear ethylene copolymers.

For the synthesis of branched polyethylene, the catalysts employed are generally insoluble in the ethylene monomer. A variety of catalysts can be utilized. Common catalysts are chromium based catalysts. In addition, these catalysts are not generally site specific and thus a broader molecular weight distribution is obtained. U.S. Pat. No. 3,645,992 discloses a process for producing branched ethylene copolymers, and it is hereby incorporated by reference.

In general, the polymerization to produce the ethylene copolymer can be accomplished at conditions well known in the prior art for Ziegler-Natta or Kaminsky-Sinn type polymerization reactions, that is, temperatures from 0° C. to about 250° C. and pressures from atmospheric to about 1000 atmospheres (100 MPa). Suspension, solution, slurry, gas phase or other process conditions may be employed if desired. A support may be employed but preferably the catalysts are used in a homogeneous manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in the polymerization process. It is, however, preferred to form the active catalyst in a separate step in a suitable solvent prior to adding the active catalyst to the polymerization mixture.

Sources of linear polyethylene include, but are not limited to, Exxon Exact® polyethylene, Dow Affinity® polyethylene, Atofina Finacene® polyethylene, and Mitsui Petrochemical Company Tafiner® polyethylene. A source of branched ethylene copolymer can be obtained as Epolene® polyethylene produced by Eastman Chemical Company.

The tackifier resin can be any tackifier resin known in the art that is compatible with the ethylene copolymer and the grafted polyolefin. Compatibility refers to the ability of different adhesive components to blend together and form a homogenous system. The term "tackifier" means any of several compositions useful for imparting tack to adhesive compositions.

Suitable classes of tackifiers include, but are not limited to, aliphatic resins, cycloaliphatic resins, aromatic hydrocarbon resins, mixed aliphatic-aromatic resins, polyterpenes, aromatically modified terpene resins, rosins, rosins esters, and hydrogenated rosin esters, and mixtures thereof. These tackifiers can also have differing degrees of hydrogenation or saturation, and can also be modified by different compounds. Modifiers include, but are not limited to, homopolymers, copolymers and terpolymers of ethylene, ethylene vinyl acetate, n-butyl acrylate copolymers, ethylene methacrylate copolymers, ethylene acrylic acid copolymers as well as triblock, diblock and multiblock copolymers. Preferably, the tackifier resin can be at least one hydrogenated hydrocarbon resin, and most preferably, the tackifier can be at least one partially hydrogenated cycloaliphatic hydrocarbon resin.

The tackifier resin can be characterized by a Ring and Ball softening point ranging from about 70° C. to about 150° C., preferably from about 90° C. to about 140° C., most preferably from 100° C. to 135° C. The tackifier resin can have a viscosity at 177° C., as measured using a Brookfield viscometer, of less than or equal to about 5,000 centipoise.

Aliphatic resins are defined as tackifiers produced from at least one monomer selected from alkanes, alkenes, and alkynes. These monomers can be straight chains or branched. For example, an aliphatic resin can be produced by polymerizing cis- and trans-piperylene, isoprene, and dicyclopentadiene. Examples of aliphatic resins include, but are not limited to, Piccotac® 1095 from Eastman Chemical; Hikorez®C-110 available from Kolon Industries; and Wingtack® 95 available from Goodyear Chemical. Hydrogenated cycloaliphatic resins include, but are not limited to, Eastotac® H-100, Eastotac® H-115, Eastotac® H-130, and Eastotac® H-142 available from Eastman Chemical. These tackifier resins have Ring and Ball softening points of 100° C., 115° C., 130° C., and 142° C., respectively. The Eastotac® resins are available in various grades (E, R, L and W) that differ in the level of hydrogenation.

Aromatic hydrocarbon resins are defined as hydrocarbon resins produced from at least one unsaturated cyclic hydrocarbon monomer having one or more rings. For example, aromatic hydrocarbon resins can be produced from polymerizing indene or methylindene with styrene or methylstyrene in the presence of a Lewis acid. Commercial examples of aromatic hydrocarbon resins include, but are not limited to, Kristalex® 3100 and Kristalex® 5140 available from Eastman Chemical. Hydrogenated aromatic resins include, but are not limited to, Regalrez® 1094 and Regalrez® 1128 available from Eastman Chemical.

Aliphatic-aromatic tackifier resins are produced from at least one aliphatic monomer and at least one aromatic monomer. Aliphatic monomers and aromatic monomers were defined previously in this disclosure. Examples of aliphatic-aromatic tackifier resins include, but are not limited to, Piccotac 9095 available from Eastman Chemical and Wingtack® Extra available from Goodyear Chemical. Hydrogenated aliphatic-aromatic resins include, but are not limited to, Regalite® V3100 available from Eastman Chemical and Escorez®5600 available from Exxon Mobil Chemical.

Polyterpene resins are defined as tackifier resins produced from at least one terpene monomer. For example, α-pinene, β-pinene, d-limonene, and dipentene can be polymerized in the presence of aluminum chloride to provide polyterpene tackifier resins. Other examples of polyterpene tackifier resins include, but are not limited to, Sylvares® TR 1100 available from Arizona Chemical, and Piccolyte® A125 available from Pinova.

Examples of aromatically modified terpene resins include, but are not limited to, Sylvares® ZT 105LT and Sylvares® ZT 115LT available from Arizona Chemical.

Rosins and rosin derivatives include gum rosin, wood rosin, tall oil rosins, dimerized rosins and polymerized rosins. Examples include, but are not limited to, Foral® AX-E, Foralyn® 90, Dymerex® resin, Polystix® 90 and Permalyn® 3100 available from Eastman Chemical. Other useful examples are Sylvatac® RE 4216 and Sylvatac® RE 85 available from Arizona Chemical. Any grafted polyolefin known in the art can be utilized in this invention. Polyolefins can be grafted with at least one unsaturated polycarboxylic acid, anhydride, or ester thereof. The unsaturated polycarboxylic acid is an organic acid comprising at least two carboxyl groups. The polyolefins that can be grafted are prepared from olefins containing at least 2 carbon atoms. Such polyolefins include, but are not limited to, homopolymers and copolymers comprising repeating units from at least one monomer selected from ethylene, propylene, 1-butene, 4-methyl-1-pentene, 3-methyl-1-butene, 4,4-dimethyl-1-pentene, 3-methylpentene-1,4-methylhexene-1,5-ethylhexene-1,6-methylhexene-1,1-hexene, 1-heptene, 1-octene, 1-nonene, 1-decene, and 1-dodecene, and the like.

The grafted polyolefin can be produced by any process known in the art. In one embodiment, the reaction of the polyolefin with an unsaturated polycarboxylic acid, anhydride or ester thereof can be carried out in the presence of a free radical source. For ease of reaction, low viscosity polyolefins can be used. These low viscosity polyolefins can be obtained by thermally degrading conventional high molecular weight polyolefins prepared by conventional polymerization processes. For example, one such suitable conventional polyolefin is the highly crystalline polypropylene prepared according to U.S. Pat. No. 2,969,345. Thermal degradation of conventional homopolymers or copolymers can be accomplished by heating them at elevated temperatures causing the polyolefin chain to rupture apparently at the points of chain branching of the polymeric material. The degree of degradation is controlled by reaction time and temperature to give a thermally degraded low molecular weight crystallizable polymeric material having a melt viscosity range from about 100 to about 5,000 cp at 190° C. (ASTM D-1238 using 0.04+0.0002 inch orifice). By carefully controlling the time, temperature and agitation, a thermally degraded polyolefin of relative narrower molecular weight range than the starting high molecular weight polyolefin is obtained. The degradation can be carried out at a temperature from about 290° C. to about 425° C.

These low viscosity polyolefins can then be reacted with unsaturated polycarboxylic acids, anhydrides or esters thereof at temperatures generally less than about 300° C., preferably from about 150° C. to about 250° C. in the presence of free radical sources. Suitable free radical sources include, but are not limited to, peroxides, such as, ditertiary butyl peroxide, tertiary butyl hydroperoxide, cumene hydroperoxide, p-methane peroxide, p-methane hydroperiode compounds; azo compounds, such as, azobis(isobutyronitrile), and irradiation sources, such as cobalt, uranium, thorium, and ultraviolet light.

Preferably, about 1 to about 10 percent unsaturated polycarboxylic acid, anhydride or esters thereof, based on the weight of the low viscosity polyolefin, can be used. The amount of the free radical source can range from about 0.01 to about 0.5 percent based on the weight of the low viscosity polyolefin. The reaction may be carried out either in a batchwise or a continuous manner with contact times in the order of about 10 minutes to about 2 hours.

Suitable unsaturated polycarboxylic acids and anhydrides include, but are not limited to, maleaic acid, maleic anhydride, fumaric acid, citraconic anhydride, aconitric anhydride, itaconic anhydride, and mixtures thereof. Suitable esters are, for example, the half or full esters derived from methyl maleate, ethyl maleate, dimethyl maleate, dimethyl fumarate, methyl ethyl maleate, dibutyl maleate, dipropyl maleate, and the like, or those compounds which form these compounds at elevated reaction temperatures such as citric acid, for example.

The reaction of the polyolefin can be carried out in an extruder or a Banbury mixer. Processes for producing the grafted polyolefin are disclosed in U.S. Pat. Nos. 3,480,580, 3,481,910; 3,856,889; the disclosures of which are incorporated herein by reference.

In one embodiment, the grafted polyolefin has been reacted to such an extent that the saponification number is about 3 to about 60, preferably about 3 to about 10, more preferably from 3 to 7. The saponification number of the grafted polyolefin was determined by ASTM D-1994-95.

The grafted polyolefin used in the inventive adhesive composition can have a viscosity of about 350 to about 15,000 centipoise at 150° C. The viscosity of the grafted polyolefin can also range from about 2,000 to 8,000 centipoise at 150° C. The viscosity of the graft polyolefin was determined by ASTM D-3236.

The grafted polyolefin used in the inventive adhesive composition can have a melt index ranging from about 100 to about 5,000 g/10 min at 190° C. The melt index of the grafted polyolefin can also range from about 1,000 to about 5,000 g/10 min at 190° C. or from about 2,000 to about 4,000 g/10 min at 190° C. ASTM D-1238 was utilized to measure the melt index. The amount of the ethylene copolymer, tackifier resin, and grafted polyolefin is that which is sufficient to obtain an onset of fiber tear of less than about 35° F. In one embodiment of this invention, the amount of the ethylene copolymer can range from about 30% by weight to about 80% by weight based on the weight of the adhesive composition, preferably from 50% by weight to 70% by weight. The amount of grafted polyolefin can range from about 2% by weight to about 25% by weight based on the weight of the adhesive composition, preferably from 5% by weight to 15% by weight. The amount of tackifier resin can range from about 15% by weight to about 45% by weight based on the weight of the adhesive composition, preferably from 25% by weight to 35% by weight.

Various additives can be added to the adhesive composition to give desired properties or for preventing degradation, or for any other purpose. Such additives include, but are not limited to, reinforcing agents, fire retardants, foaming agents, conventional tackifiers, plasticizers, oils, antioxidants, polymers, curable/reactive monomers, crosslinking agents, fillers, dyes and pigments. Because of the number of possible compounding ingredients, the properties of the adhesive composition prepared according to this invention can be varied to satisfy most foreseeable requirements for tack, peel, strength, shear strength, and solvent media resistant, on whatever combination of substrate utilized.

The adhesive may also contain a stabilizer or antioxidant. These additives prevent degradation of the adhesive cased by reactions with oxygen that are initiated by heat, light, unsaturation or residual catalyst from raw materials. Suitable stabilizers and antioxidants include, but are not limited to, hindered phenols and multifunctional phenols, such as, sulfur and phosphorous-containing phenols. Representative hindered phenols include, but are not limited to, 4,4'-thiobis (6-tert-butyl-o-cresol); 6-(4-hydroxyphenoxy)-2,4-bis(n-octyl-thio)-1,3,5 triazine; 1,3,5-trimethyl-2,4,6-tri-(3,5-ditert-butyl-4-hydroxybenzyl)benzene; 2,6-ditertbutylphenol; zinc dibutyl dithiocarbamate; 4,4'-methylene-bis-(2,6-di-tert-butylphenol); tetrakis[methylene-3-(3',5'-di-t-butyl-4-hydroxyphenyl)-propionate]-methane; pentaerythritol tetrakis-3(3, 5-di-tert-butyl-4-hydroxyphenyl)-propionate; lauryl stearyl thiodipropionate; sorbitol hexa[3-(3,5-di-tert-butyl-4-hydroxy-phenyl)-propionate]; dilauryl 3,3'-thiodipropionate; 2,6-di-tert-butyl-p-cresol; octadecyl-3-(3,5-di-tertbutyl-4-hydroxyphenol)-propionate and the like. Useful examples of antioxidants include, but are not limited to, Irganox®565, 1010 and 1076, Irgafos® 168, Cyanox® DLTDP and 1212. These stabilizers and antioxidants, if used, are generally present in amount of about 0.1% by weight to about 1.5% by weight, more preferably 0.25% by weight to 1.0% by weight.

In another embodiment of this invention, a process is provided to produce the adhesive composition. The process comprising contacting at least one ethylene copolymer, at least one tackifier resin, and at least one grafted polyolefin. The contacting can be conducted by any method known in the art.

In one embodiment, the ethylene copolymer, grafted polyolefin, and tackifier resin are melted at a temperature of about 160° C. to about 200° C. and mixed until a homogeneous mixture is obtained. Various methods for mixing materials of this type are known to the art, and any method that produces a homogeneous mixture is satisfactory. Generally, these components blend easily, and a heated vessel equipped with a stirrer is all that is required. For example, a Cowles stirrer provides effective mixing for preparing these adhesive compositions. Solvents, such as, but not limited to, hexane, heptane, mineral spirits, xylene, toluene, benzene, chlorinated hydrocarbons are not needed to prepare the adhesive compositions of this invention; however, they can be used if desired.

In another embodiment of this invention, a process is provided to produce the adhesive composition. The process comprises contacting at a temperature in a range of about 160° C. to about 200° C. at least one ethylene copolymer having a density from about 0.85 g/ml to about 0.92 g/ml, maleated polyethylene, and at least one hydrogenated hydrocarbon resin to produce the adhesive composition.

In another embodiment of this invention, a process is provided to produce the adhesive composition. The process comprises contacting at a temperature in a range of about 160° C. to about 200° C. at least one ethylene copolymer having a density from about 0.85 g/ml to about 0.92 g/ml, maleated polyethylene, and at least one partially hydrogenated cycloaliphatic hydrocarbon resin to produce the adhesive composition.

In yet another embodiment of this invention, a process is provided to produce the adhesive composition. The process comprising: 1) heating at least one ethylene copolymer having a density from about 0.85 g/ml to about 0.92 g/ml, maleated polyethylene, and at least one partially hydrogenated hydrocarbon resin at a temperature in a range of about 160° C. to about 200° C. to produce a melt; and 2) mixing the melt to produce the adhesive composition.

The inventive adhesive compositions can then be applied to a substrate by being extruded onto the surface of the substrate, while in the melt phase, and then contacted with another surface which is a second substrate or second surface of the same substrate. Suitable substrates include, but are not limited to, paper, corrugated board, chip board, cardstock films, and filmic materials.

The adhesive composition of the present invention has improved properties over adhesives that do not contain grafted polyolefins. The onset of fiber tear for the inventive adhesive composition can range from less than about 35° F., preferably less than about 25° F., and most preferably less than 15° F.

The shear adhesion failure test (SAFT) of the inventive adhesive composition is greater than about 180° F., and preferably ranges from 180° F. to 240° F.

The peel adhesion failure test (PAFT) of the inventive adhesive composition is greater than about 110° F., and preferably ranges from 110° F. to 150° F.

EXAMPLES

This invention can be further illustrated by the following examples of preferred embodiments thereof, although it will be understood that these examples are included merely for purposes of illustration and are not intended to limit the scope of the invention.

Several adhesive compositions were prepared as follows. All ingredients were charged to a pint reactor. The reactor was then placed in a 177° C. oven for 15-20 min. After pre-heating in the oven, the adhesive composition was mixed for 3040 minutes using a mechanical stirrer and a heating block pre-set to 200° C. The adhesive composition was decanted on release paper and allowed to cool.

The performance of the adhesive compositions was determined by low temperature testing of corrugated cardboard, PAFT (Peel Adhesion Failure Temperature), and SAFT (Shear Adhesion Failure Temperature).

Low temperature testing of corrugated cardboard was determined by onset of fiber tear. This test was conducted as follows. An aluminum-weighing dish containing approximately 10-15 grams of an adhesive composition was placed in a 177° C. oven for 15-20 min. After heating, a small aliquot of the adhesive composition, approximately 0.5-1 gram, was decanted onto a piece of cardboard with dimensions of 2 inches by 2.5 inches. A second piece of cardboard with the same dimensions was immediately placed on top, finger pressure was gently applied, and the bond was allowed to cool. Samples were conditioned overnight at 70° F./50% relative humidity. The bonded samples were then placed in a refrigeration room at a specific temperature and conditioned for 30 minutes. Samples were pulled apart by hand and percent fiber tear recorded. Various temperatures were evaluated. The temperature at which the onset of fiber tear occurred was noted. Both recycled and virgin corrugated cardboard from Jefferson Smurfit were evaluated.

PAFT results were measured by following ASTM D-4498. Bonded samples were made with 40 lb Kraft paper. Bond thickness was approximately 0.010"-0.015". Bonded samples were placed in an oven and hung with a 100-gram weight according to the ASTM method. Initial temperature of the oven was 30° C. Bonds were then subjected to a heating rate of 0.5° C./minute. The time to failure was noted and converted to peel adhesion failure temperature.

SAFT results were measured by following ASTM D-4498. Bonded samples were made with 40 lb Kraft paper. Bond thickness was approximately 0.010-0.015". Bonded samples were placed in an oven and hung with a 500-gram weight according to the ASTM method. Initial temperature of the oven was 30° C. Bonds were then subjected to a heating rate of 0.5° C./minute. The time to failure was noted and converted to shear adhesion failure temperature.

The adhesive compositions were made with either linear or branched polyethylene (PE). The following are illustrative adhesive examples and corresponding results.

TABLE 1

| | Adhesive Formulations | | | | | |
|---|---|---|---|---|---|---|
| Adhesive | Base Polymer, Type | Base Polymer, Parts | Tackifier Resin(s) | Tackifier Resin(s), Parts | Additive | Additive, Parts |
| Comparative #1 | Linear PE d = 0.9035 g/mL | 70 | Eastotac ® H-130R | 30 | | |
| Comparative #2 | Linear PE d = 0.9035 g/mL | 70 | Eastotac ® H-130W | 30 | | |
| Comparative #3 | Linear PE d = 0.9035 g/mL | 65 | Eastotac ® H-130R | 30 | Epolene ® C-15 (non-Maleated Polyethylene) | 5 |
| Inventive #4 | Linear PE d = 0.9035 g/mL | 65 | Eastotac ® H-130R | 30 | Epolene ® C-18 (Maleated Polyethylene) | 5 |

TABLE 1-continued

Adhesive Formulations

| Adhesive | Base Polymer, Type | Base Polymer, Parts | Tackifier Resin(s) | Tackifier Resin(s), Parts | Additive | Additive, Parts |
|---|---|---|---|---|---|---|
| Comparative #5 | Linear PE d = 0.9070 g/mL | 73 | Exxon Escorez® 5637 | 27 | | |
| Comparative #6 | Branched PE d = 0.9060 g/mL | 73 | Eastotac® H-115W | 27 | | |
| Inventive #7 | Branched PE d = 0.9060 g/mL | 73 | Eastotac® H-115W | 22 | Epolene® C-18 (Maleated Polyethylene) | 5 |
| Inventive #8 | Linear PE d = 0.9035 g/mL | 64.5 | Eastotac® H-130R | 27.5 | Epolene® C-18 (Maleated Polyethylene) | 7.5 |
| Comparative #9 | Linear PE d = 0.9039 g/mL | 69.5 | Eastotac® H-130R | 30 | | |
| Inventive #10 | Linear PE d = 0.9039 g/mL | 64.5 | Eastotac® H-130R | 27.5 | Epolene® C-18 (Maleated Polyethylene) | 7.5 |

Note:
All adhesive formulations contained 0.5 parts Irganox 1010, an antioxidant.

Adhesion test results are shown in Table 2.

TABLE 2

Adhesive Results

| Adhesive | PAFT, °F. | SAFT, °F. | Onset of Fiber Tear, °F. Virgin Cardboard | Onset of Fiber Tear, °F. Recycled Cardboard |
|---|---|---|---|---|
| Comparative #1 | 127.3 ± 4.5 | Not Recorded | 45–50 | 45–50 |
| Comparative #2 | 128.4 ± 5.3 | Not Recorded | 45–50 | 45–50 |
| Comparative #3 | 124.5 ± 2.7 | Not Recorded | 45–50 | 45–50 |
| Inventive #4 | 138.0 ± 3.4 | Not Recorded | 15–20 | 15–20 |
| Comparative #5 | 128.9 ± 3.4 | 220.9 ± 7.3 | 45–50 | 45–50 |
| Comparative #6 | 119.6 ± 0.4 | 197 ± 16.6 | 25–30 | 25–30 |
| Inventive #7 | 124.5 ± 3.4 | 206 ± 17.0 | 0–5 | 0–5 |
| Inventive #8 | 136.5 ± 5.4 | Not Recorded | 10–15 | 10–15 |
| Comparative #9 | 130.8 ± 4.6 | 211.9 ± 2.8 | 35–40 | 35–40 |
| Inventive #10 | 143.8 ± 4.5 | 216.8 ± 5.1 | 0–5 | 0–5 |

Comparative Adhesives #1 and #2 contain linear PE and a tackifier resin. PAFT values were acceptable, but low temperature performance on corrugated cardboard was inadequate. The incorporation of maleated polyethylene, as shown in Inventive Adhesive #4, broadened the performance window of the adhesives. Both PAFT values and low temperature performance were dramatically improved. The onset of fiber tear of Inventive Adhesive #3 ranged from 15-20° F. compared to 45-50° F. for Comparative Adhesives #1 and #2 that did not contain maleated PE.

For comparative purposes, an adhesive containing non-maleated PE was evaluated. Comparative Adhesive #3 was synthesized using Epolene® C15 non-maleated PE obtained from Eastman Chemical Company. It may be seen from PAFT and low temperature results that adhesion was not improved.

Comparative Adhesive #5 was an adhesive composition containing linear PE and Exxon Escorez® 5637 tackifier resin. The linear PE containing adhesive has a higher density than adhesives #1 through #4. PAFT results were acceptable, but low temperature performance was insufficient.

Adhesives #6 and #7 illustrated the use of tackifier resins in branched PE. The addition of maleated PE to Inventive Adhesive #7 broadened the temperature performance of the adhesive, particularly the low temperature performance, which ranged from 0-5° F.

Adhesives #8 through #10 were based on a linear PE with a lower density. Again, it is evident that the incorporation of maleated PE broadened the performance window of the adhesive. Inventive Adhesives #8 and #10 had a PAFT of 136.5° F.±5.8 and 143.8° F.±4.5, respectively, and an onset of fiber tear of 10-15° F. and 0-5° F. respectively compared to Comparative Adhesive #9 having a PAFT of 130.8±4.6 and an onset of fiber tear ranging from 35-40° F.

In the specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An adhesive composition consisting essentially of:
   (1) at least one copolymer comprising repeating units from ethylene and at least one α-olefin;
   (2) at least one tackifier resin; and
   (3) at least one grafted polyolefin;
   wherein said adhesive composition has an onset of fiber tear of less than about 35° F., and said grafted polyolefin has a melt index ranging from above 200 to about 5,000 g/10 mm at 190° C.

2. An adhesive composition according to claim 1 wherein said α-olefin has from 3 to about 12 carbon atoms.

3. An adhesive composition according to claim 2 wherein said α-olefin is selected from the group consisting of 1-propene, 1-butene, isobutylene, 1-hexene, 4-methyl-1-pentene, and 1-octene.

4. An adhesive composition according to claim 1 wherein said copolymer has a density ranging from about 0.85 g/ml to about 0.92 g/ml.

5. An adhesive composition according to claim 1 wherein said copolymer is linear or substantially linear and produced by at least one metallocene catalyst or singe-site catalyst.

6. An adhesive composition according to claim 1 wherein said copolymer is branched.

7. An adhesive composition according to claim 1 wherein said tackifier resin is at least one selected from the group consisting of aliphatic resins, cycloaliphatic resins, aromatic hydrocarbon resins, mixed aliphatic-aromatic resins, polyterpenes, aromatically modified terpene resins, rosins, rosins esters, and hydrogenated rosin esters, and mixtures thereof.

8. An adhesive composition according to claim 7 wherein said tackifier resin is partially or fully hydrogenated.

9. An adhesive composition according to claim 7 wherein said tackifier resin is modified by a modifier selected from the group consisting of homopolymers, copolymers and terpolymers of ethylene, ethylene vinyl acetate, n-butyl acrylate copolymers, ethylene methacrylate copolymers, ethylene acrylic acid copolymers, and triblock, diblock, and multiblock copolymers.

10. An adhesive composition according to claim 7 wherein said tackifier resin is at least one hydrogenated hydrocarbon resin.

11. An adhesive composition according to claim 7 wherein said tackifier resin is at least one partially hydrogenated cycloaliphatic hydrocarbon resin.

12. An adhesive composition according to claim 7 wherein said tackifier resin has a Ring and Ball softening point ranging from about 70° C. to about 150° C.

13. An adhesive composition according to claim 7 wherein said tackifier resin has a viscosity at 177° C., as measured using a Brookfield viscometer, of less than or equal to about 5,000 centipoise.

14. An adhesive composition according to claim 1 wherein said grafted polyolefin is produced by grafting at least one polyolefin with at least one unsaturated polycarboxylic acid, anhydride, or ester thereof.

15. An adhesive composition according to claim 14 wherein said polyolefin comprises repeating units from olefins containing at least 2 carbon atoms.

16. An adhesive composition according to claim 15 wherein said polyolefin is at least one selected from homopolymers and copolymers comprising repeating units from at least one monomer selected from ethylene, propylene, 1-butene, 4-methyl-1-pentene, 3-methyl-1-butene, 4,4-d methyl-1-pentene, 3-methylpentene-1,4-methylhexene-1, 5-ethylhexene-1,6-methylheptene-1, 1-hexene, 1-heptene, 1-octene, 1-nonene, 1-decene, or 1-dodecene.

17. An adhesive composition according to claim 14 wherein said grafted polyolefin is produced by a reaction of said polyolefin with an unsaturated polycarbyoxylic acid, anhydride or ester in the presence of a free radical source.

18. An adhesive composition according to claim 17 wherein said polyolefin is a low viscosity polyolefin.

19. An adhesive composition according to claim 17 wherein said free radical source is selected from the group consisting of peroxides, azo compounds, and irradiation sources.

20. An adhesive composition according to claim 19 wherein said free radical source is selected from the group consisting of ditertiary butyl peroxide, tertiary butyl hydroperoxide, cumene hydroperoxide, p-methane peroxide, p-methane hydroperiode compounds, azobis(isobutyronitrile), cobalt, uranium, thorium, and ultraviolet light.

21. An adhesive composition according to claim 20 wherein the amount of said free radical source ranges from about 0.01% to about 0.5% by weight based on the weight of the polyolefin.

22. An adhesive composition according to claim 14 wherein the amount of said polycarboxylic acid, anhydride or ester thereof ranges from about 1% by weight to about 10% by weight based on the weight of said polyolefin.

23. An adhesive composition according to claim 14 wherein said polycarboxylic acid or anhydride is at least one selected from the group consisting of maleaic acid, maleic anhydride, fumaric acid, citraconic anhydride, aconitric anhydride, itaconic anhydride, and mixtures thereof.

24. An adhesive composition according to claim 14 wherein said polycarboxylic ester is at least one selected from the group consisting of half or full esters derived from methyl maleate, ethyl maleate, dimethyl maleate, dimethyl fumarate, methyl ethyl maleate, dibutyl maleate, and dipropyl maleate, or those compounds which form these compounds at elevated reaction temperatures such as citric acid.

25. An adhesive composition according to claim 14 wherein said grafted polyolefin is produced in an extruder or a Banbury mixer.

26. An adhesive composition according to claim 14 wherein said grafted polyolefin has been reacted with at least one polycarboxylic acid, anhydride, or ester thereof such that the saponification number of the grafted polyolefin is about 3 to about 60.

27. An adhesive composition according to claim 14 wherein said grafted polyolefin has a viscosity of about 350 to about 15,000 centipoise at 150° C.

28. An adhesive composition according to claim 1 wherein the amount of said copolymer ranges from about 30% by weight to about 80% by weight based on the weight of the adhesive composition.

29. An adhesive composition according to claim 1 wherein the amount of said grafted polyolefin ranges from about 2% by weight to about 25% by weight based on the weight of the adhesive composition.

30. An adhesive composition according to claim 1 wherein the amount of said tackifier resin ranges from about 15% by weight to about 45% by weight based on the weight of the adhesive composition.

31. An adhesive composition according to claim 1 further consisting essentially of at least one additive selected from the group consisting of reinforcing agents, fire retardants, foaming agents, conventional tackifiers, plasticizers, oils, antioxidants, polymers, curable/reactive monomers, crosslinking agents, fillers, dyes and pigments.

32. An adhesive composition according to claim 31 wherein said antioxidant is at least one selected from the group consisting of hindered phenols and multifunctional phenols.

33. An adhesive composition according to claim 32 wherein said antioxidant is at least one selected from the group consisting of 4,4'-thiobis (6-tert-butyl-o-cresol); 6-(4-hydroxyphenoxy)-2,4-bis(n-octyl-thio)-1,3,5 triazine; 1,3,5- trimethyl-2,4,6-tri-(3,5-ditertbutyl-4-hydroxybenzyl)benzene; 2,6-ditertbutylphenol; zinc dibutyl dithiocarbamate; 4,4'-methylene-bis-(2,6-di-tert-butylphenol); tetrakis[methylene-3-(3',5'-di-t-butyl-4-hydroxyphenyl)-propionate]-methane; pentaerythritol tetrakis-3(3,5-di-tert-butyl-4-hydroxyphenyl)-propionate; lauryl stearyl thiodipropionate; sorbitol hexa[3-(3,5-di-tert-butyl-4-hydroxy-phenyl)-propionate]; dilauryl 3,3'-thiodipropionate; 2,6-di-tert-butyl-p-cresol; octadecyl-3-(3,5-di-tertbutyl-4-hydroxyphenol)-propionate and the mixtures thereof.

34. An adhesive composition according to claim 1 wherein the onset of fiber tear for said adhesive composition is in a range of less than about 25° F.

35. An adhesive composition according to claim 34 wherein the onset of fiber tear for said adhesive composition is in a range of less than about 15° F.

36. An adhesive composition according to claim 1 wherein said adhesive composition has a peel adhesion failure temperature greater than about 110° F.

37. An adhesive composition according to claim 36 wherein said adhesive composition has a peel adhesion failure temperature in a range of from 110° F. to 150° F.

38. An adhesive composition according to claim 1 wherein said adhesive composition has a shear adhesion failure temperature greater than about 180° F.

39. An adhesive composition according to claim 38 wherein said adhesive composition has a shear adhesion failure temperature in a range from 180° F. to 240° F.

40. An article comprising said adhesive composition of claim 1 and a substrate.

41. An article according to claim 40 wherein said article is a cardboard box or package.

42. A process for producing an article comprising contacting said adhesive composition of claim 1 with at least one substrate to produce said article.

43. A process according to claim 42 wherein said substrate is selected from the group consisting of paper, corrugated board, chip board, cardstock films, and filmic materials.

44. An adhesive composition according to claim 1 wherein said grafted polyolefin has a melt index ranging from about 1,000 g/10 mm at 190° C. to about 5,000 g/10 mm at 190° C.

45. An adhesive composition according to claim 44 wherein said grafted polyolefin has a melt index ranging from about 2,000 g/10 mm at 190° C. to about 4,000 g/10 mm at 190° C.

46. A process for producing an adhesive composition, said process comprising contacting reagents to form a composition consisting essentially of at least one copolymer comprising repeating units from ethylene and at least one α-olefin, at least one tackifier resin, and at least one grafted polyolefin, wherein said grafted polyolefin has a melt index ranging from above 200 to about 5,000 g/10 min at 190° C.

47. A process according to claim 46 wherein said contacting is conducted at a temperature ranging from about 160° C. to about 200° C.

48. A process to produce an adhesive composition, said process comprising contacting, at a temperature in a range of about 160° C. to about 200° C., reagents to form a composition consisting essentially of at least one copolymer comprising repeating units from ethylene and at least one α-olefin, at least one grafted polyethylene, and at least one hydrogenated hydrocarbon resin to produce said adhesive composition; wherein said copolymer has a density from about 0.85 g/ml to about 0.92 g/ml, and said grafted polyolefin has a melt index ranging from above 200 to about 5,000 g/10 mm at 190° C.

49. A process according to claim 48 wherein said hydrogenated hydrocarbon resin is cycloaliphatic.

50. A process to produce an adhesive composition, said process comprising:
  1) heating at least one copolymer comprising repeating units from ethylene and at least one α-olefin, at least one grafted polyethylene, and at least one tackifier resin at a temperature in a range of about 160° C. to about 200° C.; and
  2) mixing said copolymer, said at least one grafted polyethylene, and said tackifier resin to produce said adhesive composition,
  wherein said grafted polyolefin has a melt index ranging from above 200 to about 5,000 g/10 mm at 190° C., and said composition consists essentially of at least one copolymer comprising repeating units from ethylene and at least one α-olefin at least one grafted polyethylene, and at least one tackifier resin.

51. A process according to claim 50 wherein said copolymer has a density ranging from about 0.85 g/ml to about 0.92 g/ml.

52. A process according to claim 51 wherein said tackifier resin is a hydrogenated hydrocarbon resin.

* * * * *